(12) United States Patent
Lin et al.

(10) Patent No.: US 11,081,805 B2
(45) Date of Patent: Aug. 3, 2021

(54) ANTENNA ARRAY AND COLLISION AVOIDANCE RADAR HAVING THE SAME

(71) Applicant: Industrial Technology Research Institute, Hsin-Chu (TW)

(72) Inventors: Chun-Chi Lin, New Taipei (TW); Chang-Sheng Chen, Taipei (TW); Guo-Shu Huang, Hsinchu County (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 52 days.

(21) Appl. No.: 16/796,421

(22) Filed: Feb. 20, 2020

(65) Prior Publication Data

US 2021/0143556 A1 May 13, 2021

(30) Foreign Application Priority Data

Nov. 11, 2019 (TW) .................. 108140811

(51) Int. Cl.
*H01Q 21/06* (2006.01)
*G01S 13/931* (2020.01)
*H01Q 1/32* (2006.01)

(52) U.S. Cl.
CPC ......... *H01Q 21/061* (2013.01); *G01S 13/931* (2013.01); *H01Q 1/3233* (2013.01)

(58) Field of Classification Search
CPC .......... H01Q 1/27; H01Q 1/32; H01Q 1/3233; H01Q 21/06; H01Q 21/061; G01S 13/88; G01S 13/93; G01S 13/931
See application file for complete search history.

(56) References Cited

U.S. PATENT DOCUMENTS 4,148,028 A * 4/1979 Fujiki .................. G01S 13/931
  342/70
6,452,534 B1 9/2002 Zoratti et al.
(Continued)

FOREIGN PATENT DOCUMENTS

| CN | 109428162 | 3/2019 |
| CN | 109428176 | 3/2019 |

(Continued)

OTHER PUBLICATIONS

B. Ku et al., "A 77-81-GHz 16-Element Phased-Array Receiver with ±50? Beam Scanning for Advanced Automotive Radars," in IEEE Transactions on Microwave Theory and Techniques, vol. 62, No. 11, pp. 2823-2832, Nov. 2014.

(Continued)

*Primary Examiner* — Jason Crawford
(74) *Attorney, Agent, or Firm* — WPAT, PC

(57) ABSTRACT

An antenna array is provided, which may include a connection portion and a plurality of antenna units. The antenna units may be disposed on the two sides of the connection portion respectively. The proximal end of each of the antenna units may be connected to the connection portion and the distal end of one or more of the antenna units may be grounded. The length of each of the antenna units may be less than or equal to ¼ wavelength of the operating frequency of the antenna array, and the distance between any two adjacent antenna units may be less than or equal to ½ wavelength of the operating frequency of the antenna array.

26 Claims, 19 Drawing Sheets

(56) References Cited

U.S. PATENT DOCUMENTS

| | | | |
|---|---|---|---|
| 6,686,867 B1* | 2/2004 | Lissel | H01Q 25/002 |
| | | | 342/70 |
| 7,009,551 B1 | 3/2006 | Sapletal et al. | |
| 9,553,362 B2 | 1/2017 | Inoue et al. | |
| 9,880,275 B2 | 1/2018 | Jeong et al. | |
| 9,917,355 B1 | 3/2018 | Lee et al. | |
| 10,135,135 B2 | 11/2018 | Huang et al. | |
| 2011/0187614 A1* | 8/2011 | Kirino | H01Q 3/32 |
| | | | 343/713 |
| 2013/0162496 A1 | 6/2013 | Wakabayashi | |
| 2018/0136327 A1* | 5/2018 | Lee | H01Q 1/3233 |
| 2020/0136263 A1* | 4/2020 | Lee | G01S 7/4004 |

FOREIGN PATENT DOCUMENTS

| | | |
|---|---|---|
| CN | 109462042 | 3/2019 |
| CN | 110637394 A | 12/2019 |
| KR | 101673200 B1 | 7/2016 |
| TW | 200903899 A | 1/2009 |
| TW | 201735442 | 10/2017 |
| TW | 201803207 | 1/2018 |

OTHER PUBLICATIONS

R. Feger et al., "A frequency-division MIMO FMCW radar system using delta-sigma-based transmitters," 2014 IEEE MTT-S International Microwave Symposium (IMS2014), Tampa, FL, 2014, pp. 1-4.

J. Lee et al. "A Fully-Integrated 77-GHz FMCW Radar Transceiver in 65-nm CMOS Technology," in IEEE Journal of Solid-State Circuits, vol. 45, No. 12, pp. 2746-2756, Dec. 2010.

J. Xu, "CPW Center-Fed Single-Layer SIW Slot Antenna Array for Automotive Radars," in IEEE Transactions on Antennas and Propagation, vol. 62, No. 9, pp. 4528-4536, Sep. 2014.

M. K. Saleem, "Lens Antenna for Wide Angle Beam Scanning at 79 GHz for Automotive Short Range Radar Applications," in IEEE Transactions on Antennas and Propagation, vol. 65, No. 4, pp. 2041-2046, Apr. 2017.

TW Notice of Allowance dated Jul. 22, 2020.

* cited by examiner

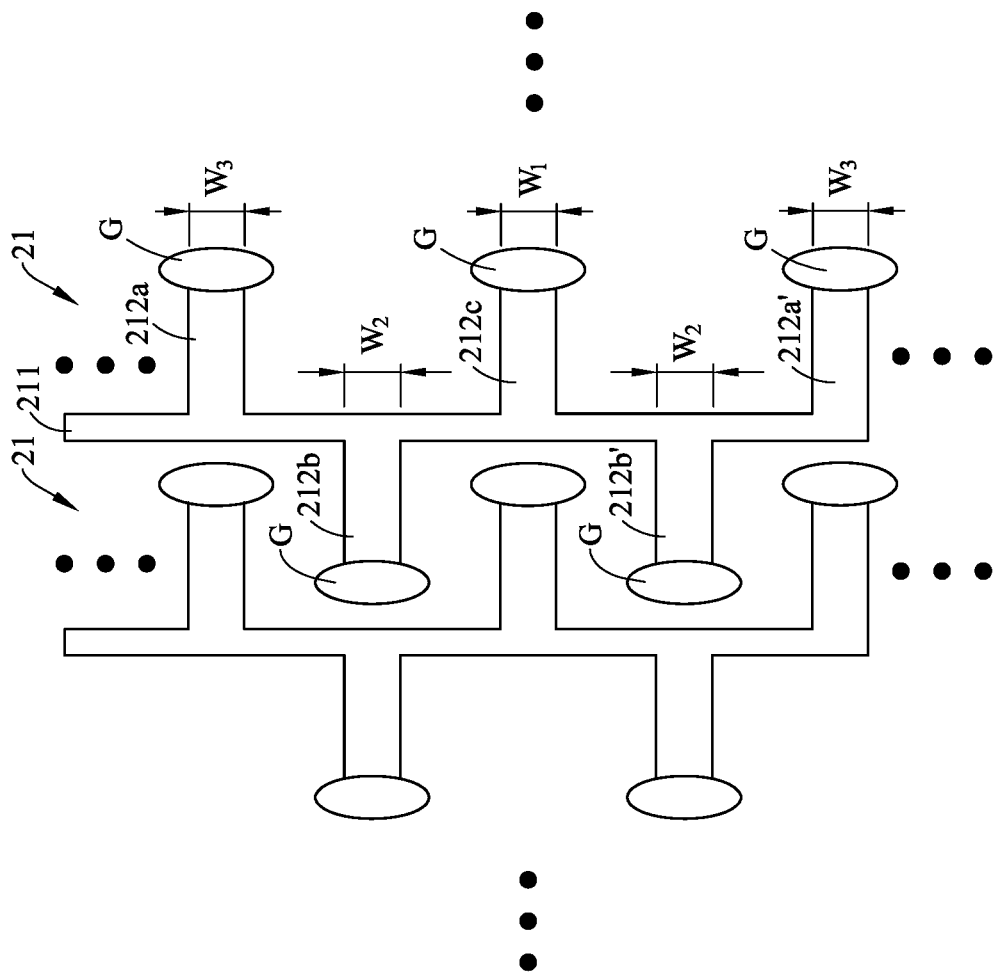

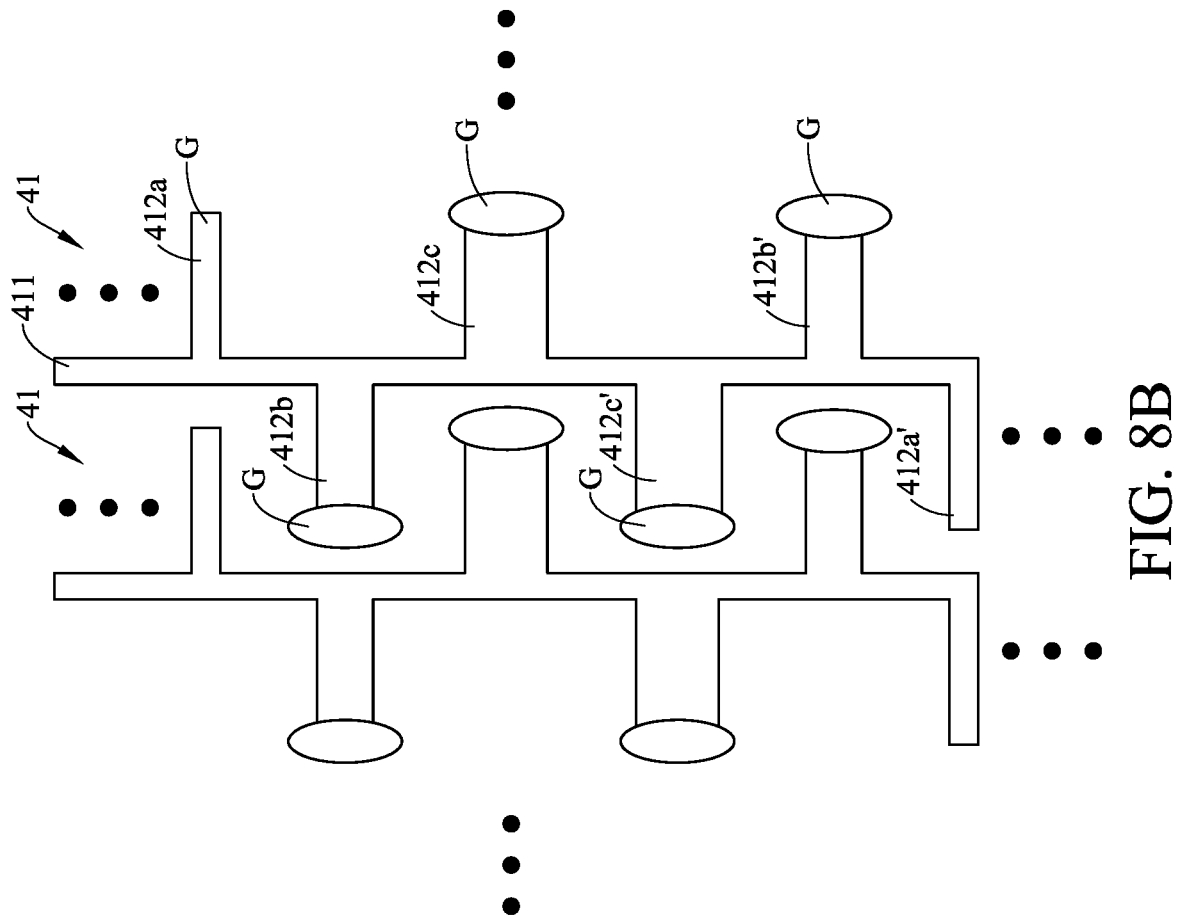

ANTENNA ARRAY AND COLLISION AVOIDANCE RADAR HAVING THE SAME

CROSS REFERENCE TO RELATED APPLICATION

All related applications are incorporated by reference. The present application is based on, and claims priority from, Taiwan Application Serial Number 108140811, filed on Nov. 11, 2019, the disclosure of which is hereby incorporated by reference herein in its entirety.

TECHNICAL FIELD

The technical field relates to an array antenna, in particular to an array antenna capable of effectively increase the field of view (FoV). The technical field further relates to a collision avoidance radar having the antenna array.

BACKGROUND

A millimeter wave radar can provide various information, such as distance, angel, speed, etc., by detecting the positions of the objects around a vehicle, and provide the above information for the driver in order to help the driver obtain real-time traffic information Millimeter wave radars can be applied to various collision avoidance radars and assistance systems, such as forward collision warning (FCW) system, blind spot detection (BSD) system, lane change assistance (LCA) system, door opening warning (DOW) system, rear cross traffic alert (RCTA) system, etc.

A collision avoidance system is usually installed inside the rear bumper of a vehicle in order to detect the objects at the both sides of the vehicle and behind the vehicle. The field of view (FoV) of currently available millimeter wave radars is about −70°~+70°.

Some currently available collision avoidance radars include several radar sensors in order to improve the performance.

Some currently available collision avoidance radars can make compensation for the performance by reducing the critical value of the signal-to-noise ratio (SNR) thereof via software algorithms.

SUMMARY

An embodiment of the disclosure relates to an antenna array, which includes a connection portion and a plurality of antenna units. The antenna units are disposed on the two sides of the connection portion respectively. The proximal end of each of the antenna units is connected to the connection portion and the distal end of one or more of the antenna units is grounded. The length of each of the antenna units is less than or equal to ¼ wavelength of the operating frequency of the antenna array, and the distance between any two adjacent antenna units is less than or equal to ½ wavelength of the operating frequency of the antenna array.

Another embodiment of the disclosure relates to a collision avoidance radar, which includes a plurality of antenna arrays and the distance between any two adjacent antenna arrays is less than or equal to ¾ wavelength of the operating frequency of the antenna arrays. Each of the antenna arrays includes a connection portion and a plurality of antenna units. The antenna units are disposed on the two sides of the connection portion respectively. The proximal end of each of the antenna units is connected to the connection portion and the distal end of one or more of the antenna units is grounded. The length of each of the antenna units is less than or equal to ¼ wavelength of the operating frequency of the antenna array, and the distance between any two adjacent antenna units is less than or equal to ½ wavelength of the operating frequency of the antenna array.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The disclosure will become more fully understood from the detailed description given herein below and the accompanying drawings which are given by way of illustration only, and thus are not limitative of the disclosure and wherein:

FIG. 6A~FIG. 6C are structural diagrams of a collision avoidance radar in accordance with a second embodiment of the disclosure.

FIG. 8A~FIG. 8C are structural diagrams of a collision avoidance radar in accordance with a fourth embodiment of the disclosure.

DETAILED DESCRIPTION

Figure 1:
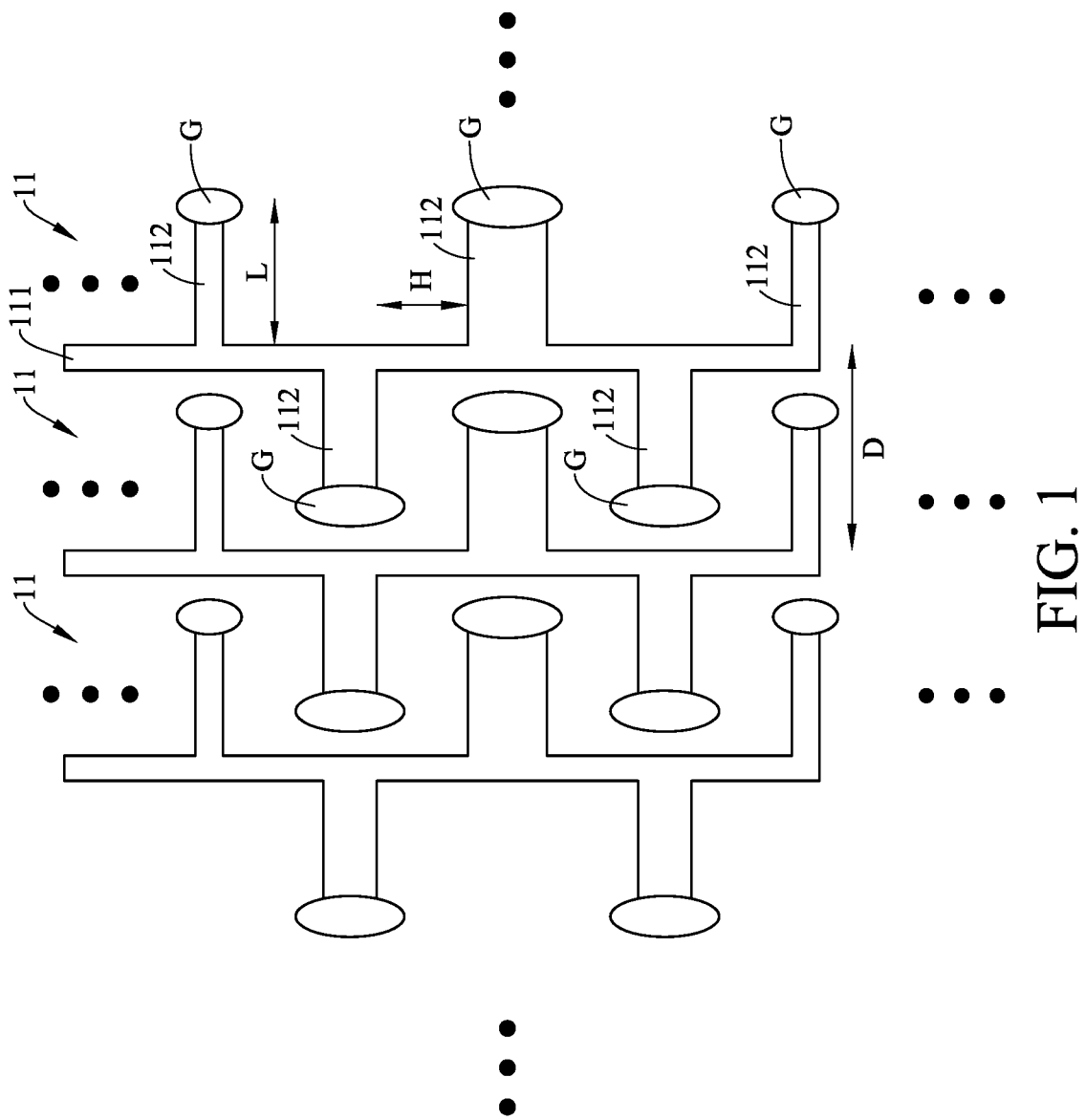
FIG. 1 is a structural diagram of a collision avoidance radar in accordance with a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is a structural diagram of a collision avoidance radar in accordance with a first embodiment of the disclosure. As shown in FIG. 1, the collision avoidance radar 1 includes a plurality of antenna arrays 11. Each of the antenna arrays 11 includes a connection portion 111 and a plurality of antenna units 112. The number of the antenna units 112 may be odd or even.

The antenna units 112 are alternatively disposed on the two sides of the connection portion 111 to form a comb structure and the widths of the antenna units 112 are not completely equal to each other. In another embodiment, the antenna units 112 may have the same width. In the embodiment, the connection portion 111 may be, but not limited to, a straight bar and the antenna units may also be, but not limited to, straight bars. In another embodiment, the connection portion 111 and the antenna units 112 may have the other shapes.

Each of the antenna units 112 has a proximal end and a distal end. The proximal ends of the antenna units 112 are connected to the connection portion 111 and the distal ends of the antenna units 112 are connected to the earth key G. In another embodiment, single or some of the antenna units 112 are grounded.

Besides, the length L of the antenna units 112 is less than or equal to ¼ wavelength of the operating frequency of the antenna array 11. In another embodiment, the length L of the antenna units 112 may be ⅛~⅜ wavelength of the operating frequency of the antenna array 11.

Moreover, the distance H of any two adjacent antenna units 112 is less than or equal to ½ wavelength of the operating frequency of the antenna array 11. In another embodiment, the distance H of any two adjacent antenna units 112 may be ¼~¾ wavelength of the operating frequency of the antenna array 11.

As described above, in the embodiment, the length L of the antenna units 112 is obviously reduced to be less than or equal to ¼ wavelength of the operating frequency of the antenna array 11. In addition, the distance H between the adjacent antenna units 112 is also obviously reduced to be less than or equal to ½ wavelength of the operating frequency of the antenna array 11. Further, the distal ends of the antenna units 112 are grounded. The above design can effectively increase the antenna gain of the large view field (greater than +70° and less than −70°) of the collision avoidance radar 1.

On the other hand, the distance D between any two adjacent antenna arrays 11 is less than or equal to ¾ wavelength of the operating frequency of the antenna arrays 11. In another embodiment, the distance D between any two adjacent antenna arrays 11 may be 0.3~0.5 wavelength of the operating frequency of the antenna arrays 11. In still another embodiment, the distance D between any two adjacent antenna arrays 11 may be 0.35~0.4 wavelength of the operating frequency of the antenna arrays 11.

As described above, in the embodiment, the length L of the antenna units 112 can be obviously decreased and the distance D between the adjacent antenna arrays can also be obviously reduced to be less than or equal to ¾ wavelength of the operating frequency of the antenna arrays 11. Via the above design, the equivalent array aperture of the antenna arrays 11 can be changed to widen the main lobe of the antenna arrays 11, which can further increase the antenna gain of the large view field of the collision avoidance radar 1. Thus, the field of view (FoV) of the collision avoidance radar 1 can be increased so as to reduce the blind zone thereof. Besides, the above design can also reduce the size of the antenna arrays, so the size of the collision avoidance radar 1 can also be reduced. Accordingly, the application of the collision avoidance radar 1 can be more flexible.

In addition, the design of the above antenna arrays 11 not only can be applied to collision avoidance radar, but also can be applied to various assistance systems, such as forward collision warning (FCW) system, blind spot detection (BSD) system, lane change assistance (LCA) system, door opening warning (DOW) system, rear cross traffic alert (RCTA) system, etc.

Figure 2:
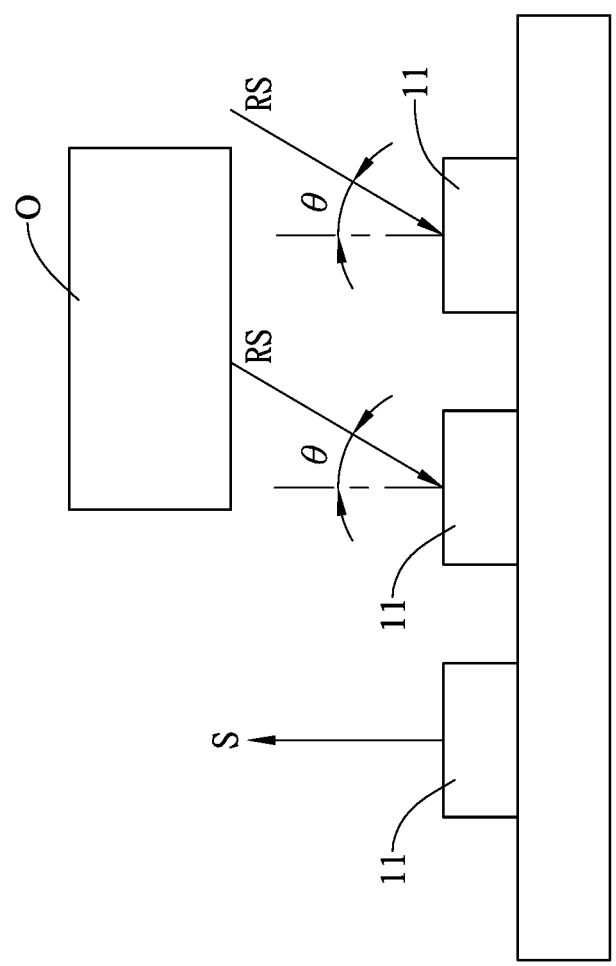
FIG. 2 is a first schematic view of the collision avoidance radar in accordance with the first embodiment of the disclosure.
Figure 3:
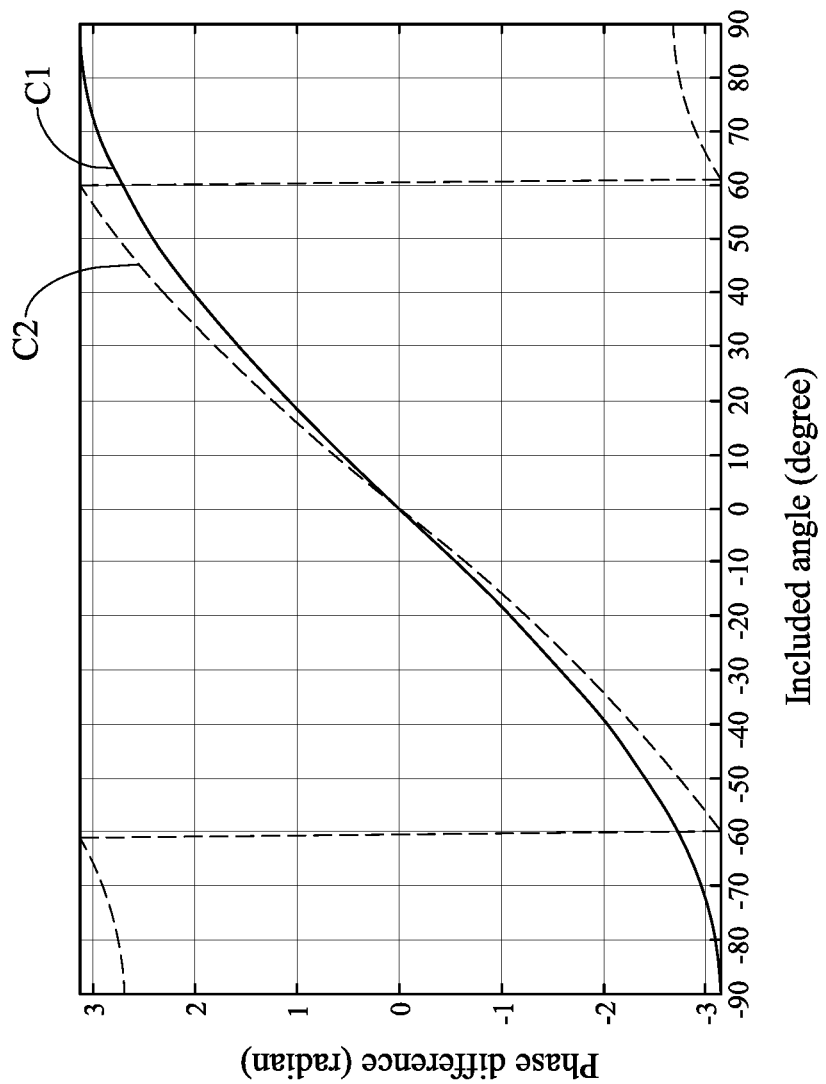
FIG. 3 is a phase difference—included angle diagram of the collision avoidance radar in accordance with the first embodiment of the disclosure.

Please refer to FIG. 2 and FIG. 3, which are a first schematic view and a phase difference—included angle diagram of the collision avoidance radar in accordance with the first embodiment of the disclosure respectively. As shown in FIG. 2, the antenna array 11 of the transmitter transmits the signal S to an object O and the antenna arrays 11 of the receiver receive the signals RS reflected by the object O. The information about the angle between the object O and a reference point can be obtained according to the phase difference between the signals RS received by the antenna arrays 11 of the receiver, as shown in Equation (1) given below:

$$\theta = \sin^{-1}\frac{\lambda\Delta\phi}{2\pi d} \quad (1)$$

In Equation (1), θ stands for the included angle; d1 stands for the distance between both the centers of the antenna arrays 11 of the receiver; λ stands for the wavelength; φ stands for the phase difference.

The curve C1 can be obtained when d1 is less than ½ wavelength of the operating frequency of the antenna arrays 11. The curve C2 can be obtained when d1 is about ½ wavelength of the operating frequency of the antenna arrays 11. As shown in FIG. 3, the slope of the curve C1 is gentler than that of the curve C2. Therefore, the FoV of the collision avoidance radar 1 can be obviously increased when d1 is less than ½ wavelength of the operating frequency of the antenna arrays 11.

Figure 4:
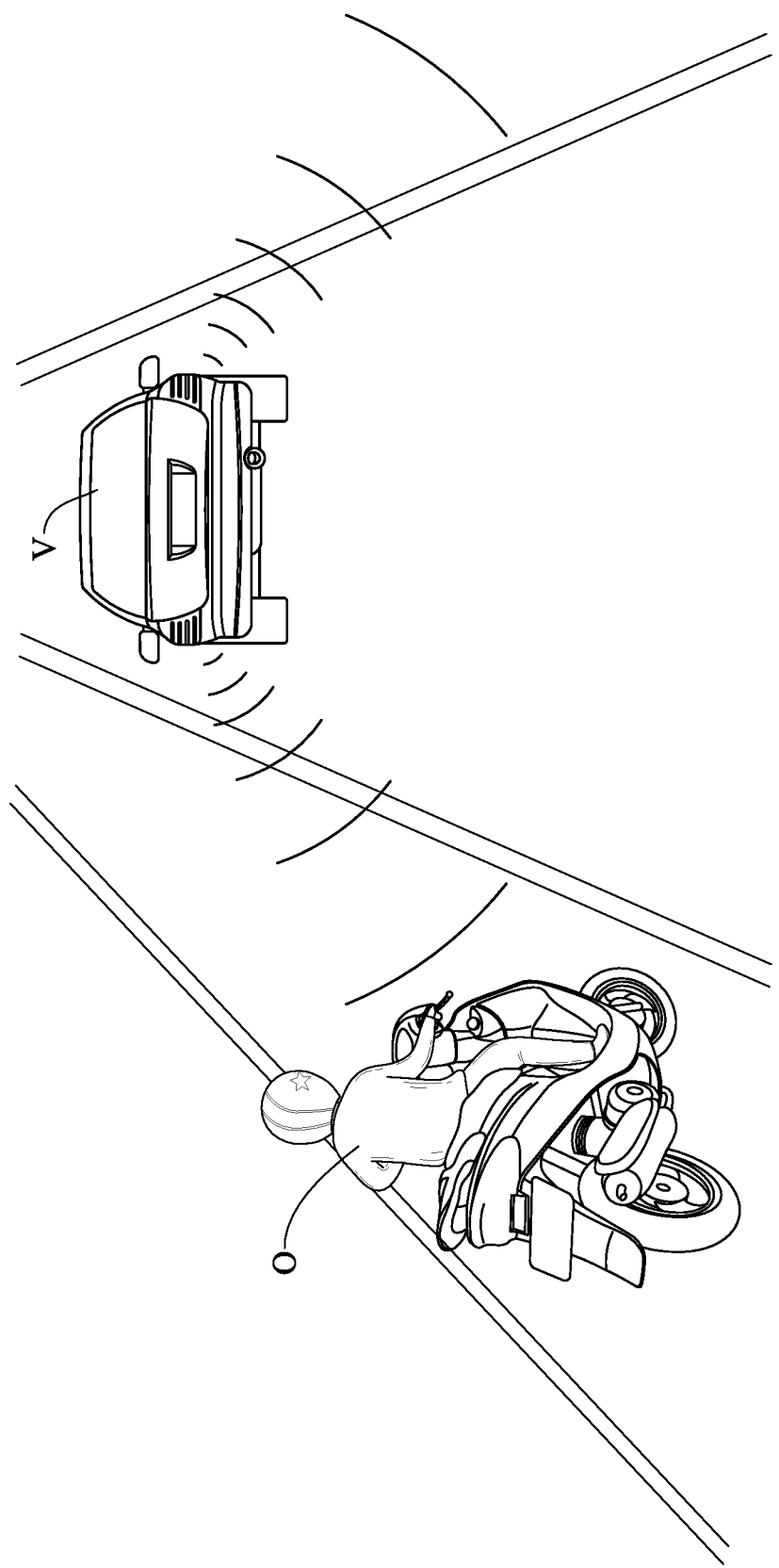
FIG. 4 is a second schematic view of the collision avoidance radar in accordance with the first embodiment of the disclosure.

Please refer to FIG. 4, which is a second schematic view of the collision avoidance radar in accordance with the first embodiment of the disclosure. As shown in FIG. 4, the FoV of the collision avoidance radar 1 of the embodiment can be effectively widened. Besides, the radiation energy of the antenna arrays 11 can be concentrated at a specific direction by beam forming technology in order to increase the detection range of the collision avoidance radar 1. In this way, when being stalled on the car V, the collision avoidance radar 1 can effectively detect the object O at the both sides of the car V or behind the car V.

Figure 5:
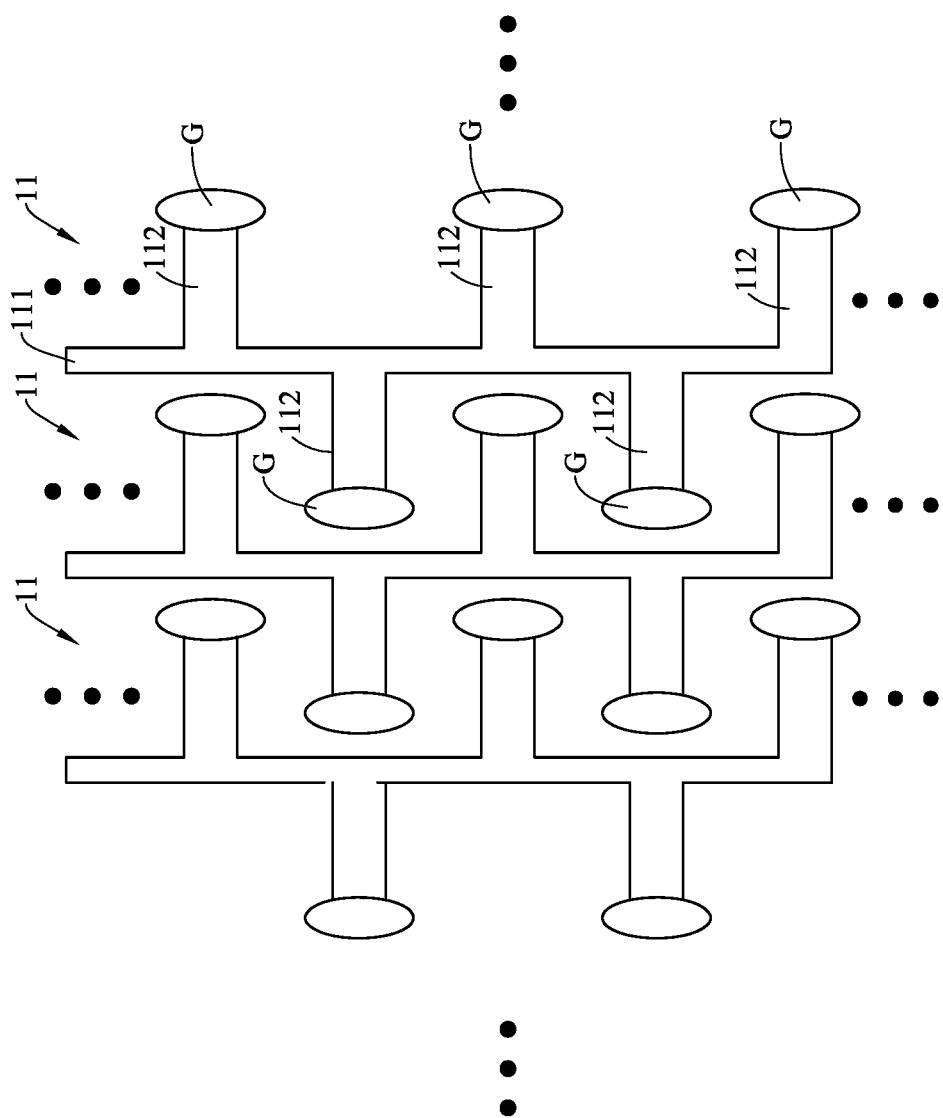
FIG. 5 is a structural diagram of another structure of the collision avoidance radar in accordance with the first embodiment of the disclosure.

Please refer to FIG. 5, which is a structural diagram of another structure of the collision avoidance radar in accordance with the first embodiment of the disclosure. As shown in FIG. 5, the antenna units 112 of the antenna arrays 11 of the collision avoidance radar 1 can also have the same width.

The embodiment just exemplifies the disclosure and is not intended to limit the scope of the disclosure. Any equivalent modification and variation according to the spirit of the disclosure is to be also included within the scope of the following claims and their equivalents.

The field of view (FoV) of currently available millimeter wave radars is about −70°~+70°, so the currently available millimeter wave radars cannot effectively detect the objects not within the above range. Accordingly, currently available collision avoidance radars still have large blind zone, so the performance thereof still needs to be further improved. Besides, some currently available collision radars can make compensation for the performance by reducing the critical value of the signal-to-noise ratio (SNR) thereof via software algorithms. However, the software algorithms can only slightly improve the performance of these currently available collision avoidance radars. The reason of the above problems is that the antenna gain of these currently available collision avoidance radars is too low; these currently available collision avoidance radars cannot overcome their original physical limits. On the contrary, according to the embodiments of the disclosure, the collision avoidance radar 1 includes a plurality of antenna arrays 11 and the distance between any two adjacent antenna arrays 11 is less than or equal to ¾ wavelength of the operating frequency of the antenna arrays 11. In this way, the antenna gain of the large view field (greater than +70° and less than −70°) of the collision avoidance radar 1 can be further increased. Thus, the FoV of the collision avoidance radar 1 can be further increased to reduce the blind zone, so the lateral detection ability and the rear detection ability of the collision avoidance radar 1 can be effectively improved.

Also, according to the embodiments of the disclosure, the collision avoidance radar 1 includes a plurality of antenna arrays 11 and the distance between any two adjacent antenna arrays 11 is less than or equal to ¾ wavelength of the operating frequency of the antenna arrays 11. In this way, the antenna gain of the large view field (greater than +70° and less than −70°) of the collision avoidance radar 1 can be further increased. Thus, the FoV of the collision avoidance radar 1 can be further increased to reduce the blind zone, so the lateral detection ability and the rear detection ability of the collision avoidance radar 1 can be effectively improved.

Besides, according to the embodiments of the disclosure, the FoV of the collision avoidance radar 1 can be effectively increased. In addition, the strength and the phase of the radiation energy of the antenna arrays 11 thereof can be controlled by beam forming technology, such that the radiation energy of the antenna arrays 11 can be concentrated at a specific direction. Thus, the detection range of the collision avoidance radar 1 can be increased, and the lateral detection ability and the rear detection ability of the collision avoidance radar 1 can be further improved.

Moreover, according to the embodiments of the disclosure, the collision avoidance radar includes a plurality of antenna arrays 11, and the distance between any two adjacent antenna arrays 11 can be less than or equal to ¾ wavelength of the operating frequency of the antenna arrays 11. Thus, the size of the collision avoidance radar 1 can decrease, so the application of the collision avoidance radar 1 can be more flexible.

Further, some currently available collision avoidance radars 1 include several radar sensors in order to improve the performance thereof. However, these radar sensors will significantly increase the cost of these currently available collision avoidance radars 1, which cannot satisfy the actual requirements. On the contrary, according to the embodiments of the disclosure, the antenna arrays 11 of the collision avoidance radar 1 can achieve great performance, so the radar sensor having single antenna array 11 can just achieve the desired technical effect. Therefore, the cost of the collision avoidance radar 1 can be obviously reduced, so the market competitiveness of the collision avoidance radar 1 can be further enhanced. As described above, the collision avoidance radar 1 according to the embodiments of the disclosure can actually achieve unpredictable technical effects.

Figure 6A:
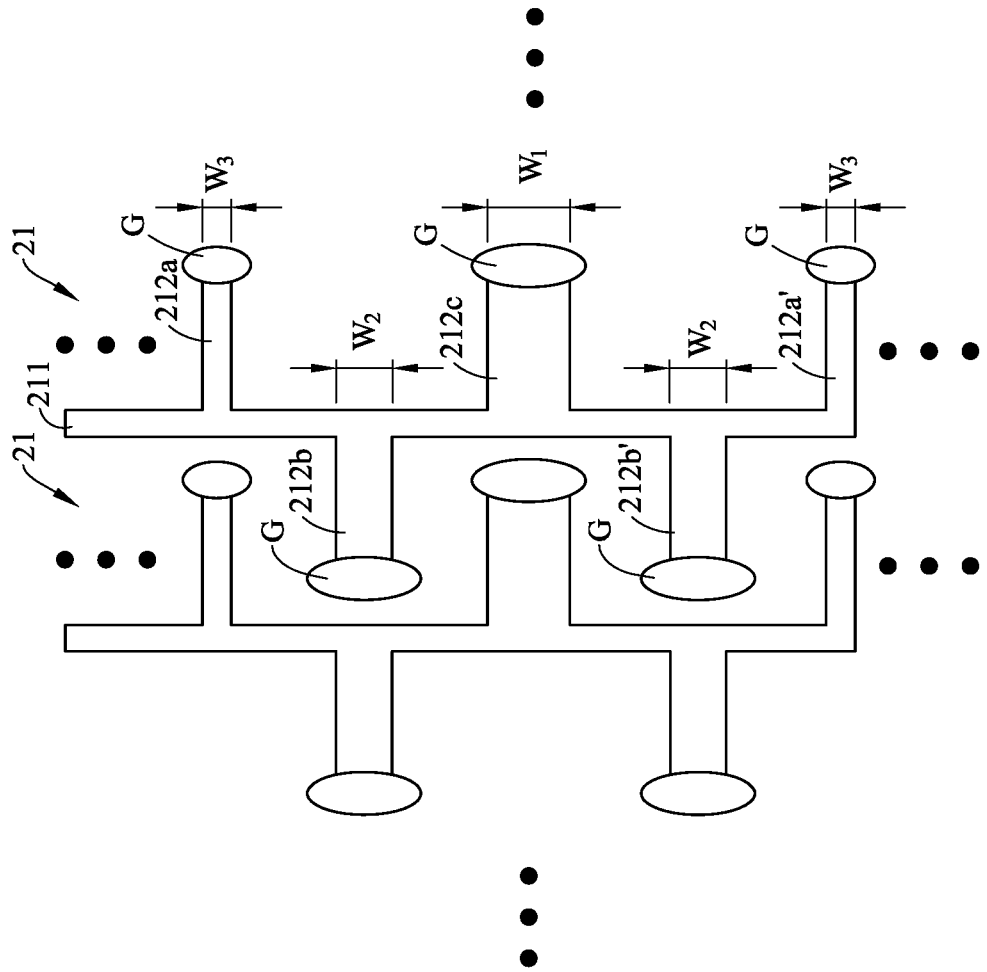
Figure 6B:
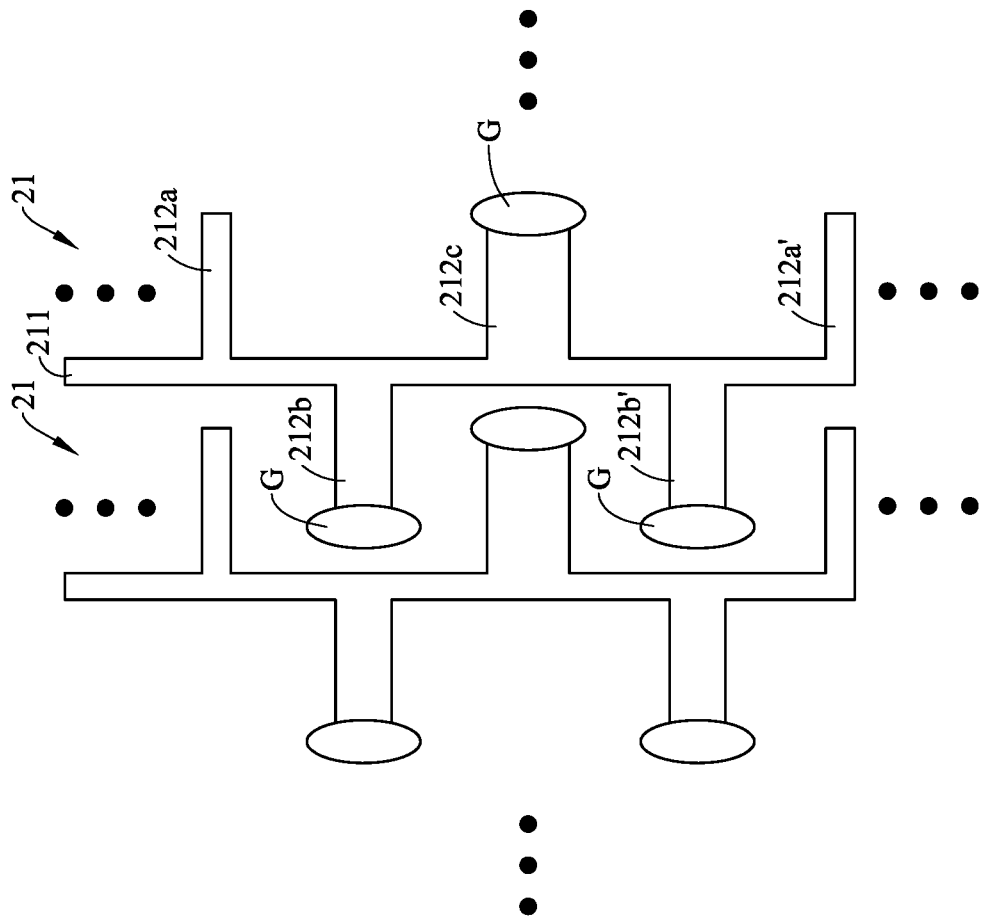

Please refer to FIG. 6A, FIG. 6B and FIG. 6C, which are structural diagrams of a collision avoidance radar in accordance with a second embodiment of the disclosure. As shown in FIG. 6A, the collision avoidance radar 2 includes a plurality of antenna arrays 21. Each of the antenna arrays 21 includes a connection portion 211 and an odd number of antenna units 212a, 212a', 212b, 212b', 212c. The embodiment illustrates the technical features of the collision avoidance radar 2 by each antenna array 21 having 5 antenna units 212a, 212a', 212b, 212b', 212c. The antenna units 212a, 212a', 212b, 212b', 212c are alternatively disposed on the two sides of the connection portion 211, such that each antenna array 21 can be a comb structure. In the embodiment, the connection portion 211 may be, but not limited to, a straight bar and the antenna units 212a, 212a', 212b, 212b', 212c may also be, but not limited to, straight bars. In another embodiment, the connection portion 211 and the antenna units 212a, 212a', 212b, 212b', 212c may have the other shapes.

The antenna unit 212c is disposed at the center of the antenna array 21 and the other antenna units 212a, 212a', 212b, 212b' are disposed to be symmetric to each other about the center of the antenna array 21 serving as a symmetry center. The widths of the antenna units 212a, 212a', 212b, 212b', 212c decrease from the center of the antenna array 21 to the two ends thereof. Besides, any two antenna units 212a, 212a' or 212b, 212b' symmetric to each other are disposed on the same side of the connection portion 211 and have the same width. According to FIG. 6A, the antenna units 212a, 212a' are symmetric to each other and disposed on the right side of the connection portion 211, and have the same width $W_3$. The antenna units 212b, 212b' are symmetric to each other and disposed on the left side of the connection portion 211, and have the same width $W_2$. The antenna unit 212c is disposed on the right side of the connection portion 211 and the width thereof is $W_1$, where $W_1 > W_2 > W_3$.

The embodiment calculates the widths of the antenna units 212a, 212a', 212b, 212b', 212c by Dolph-Chebyshev Method, such that any two adjacent ones of the antenna units 212a, 212a', 212b, 212b', 212c can attain a specific ratio. In this way, the side lobes of the antenna array 21 can be reduced, such that the strength difference between the main lobe and the side lobes of the antenna array 21 can be more obvious (e.g. 20 dB, 40 dB, . . . ). This structure can effectively lower the noises transmitted from the spaces above or below the collision avoidance radar 2, so the SNR of the collision avoidance radar 2 can be obviously increased. Thus, the performance of the collision avoidance radar 2 can be further improved. Dolph-Chebyshev Method should be known by those skilled in the art, so will not be described herein.

Similarly, the length of the antenna units 212a, 212a', 212b, 212b', 212c is less than or equal to ¼ wavelength of the operating frequency of the antenna array 21. Besides, the distance between any two adjacent ones of the antenna units 212a, 212a', 212b, 212b', 212c is less than or equal to ½ wavelength of the operating frequency of the antenna array 21. Further, the distal ends of the antenna units 212a, 212a', 212b, 212b', 212c are connected to the earth keys G. The above design can effectively increase the antenna gain of the large view field (greater than +70° and less than −70° of the collision avoidance radar 2, so the FoV of the collision avoidance radar 2 can be widened and the blind zone thereof can be reduced.

In another embodiment, it is not a necessary condition that all of the antenna units 212a, 212a', 212b, 212b', 212c are grounded. As shown in FIG. 6B, the distal ends of the antenna unit 212a at the head of the connection portion 211 and the antenna unit 212a' at the tail of the connection portion 211 are not connected to the earth keys G. However, the distal ends of the antenna units 212b, 212b', 212c between the antenna units 212a, 212a' are connected to the earth keys G.

As shown in FIG. 6C, the antenna units 212a, 212a', 212b, 212b', 212c of the antenna arrays 21 can also have the same width ($W_1=W_2=W_3$).

The embodiment just exemplifies the disclosure and is not intended to limit the scope of the disclosure. Any equivalent modification and variation according to the spirit of the disclosure is to be also included within the scope of the following claims and their equivalents.

Figure 7A:
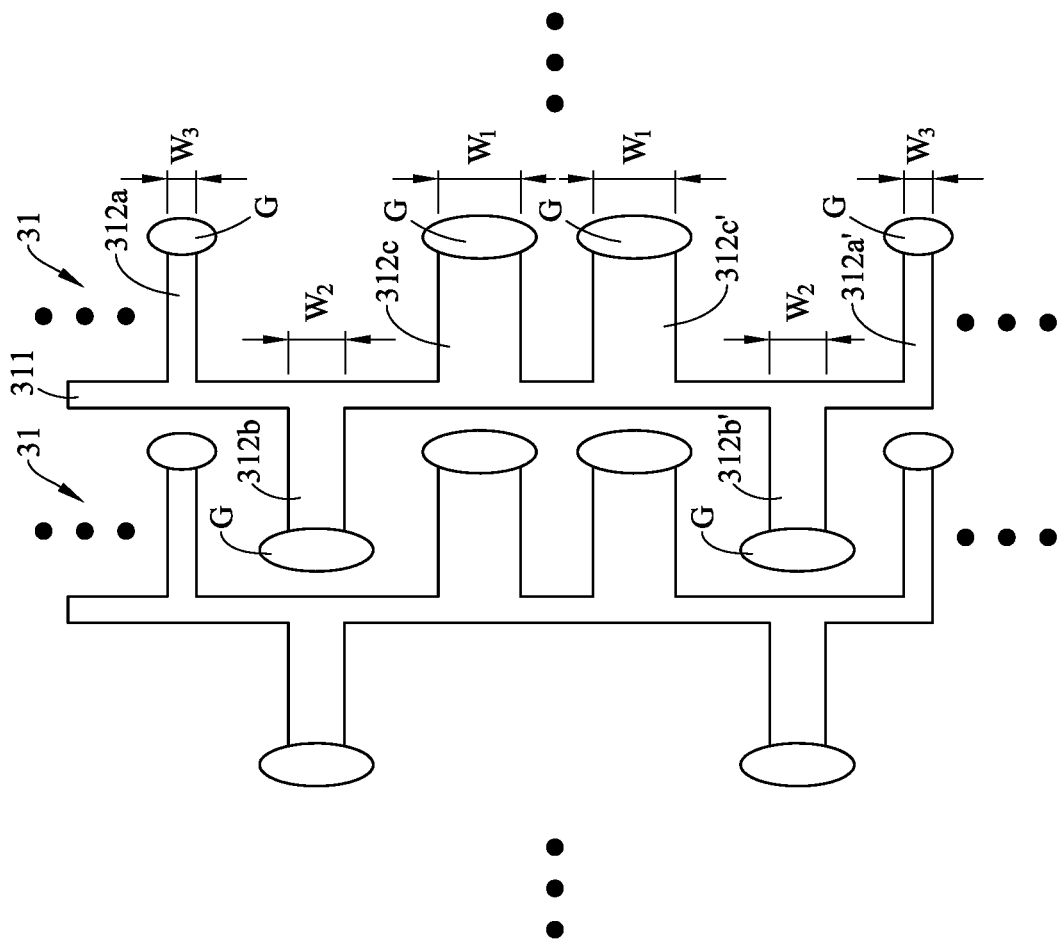
FIG. 7A~FIG. 7C are structural diagrams of a collision avoidance radar in accordance with a third embodiment of the disclosure.
Figure 7B:
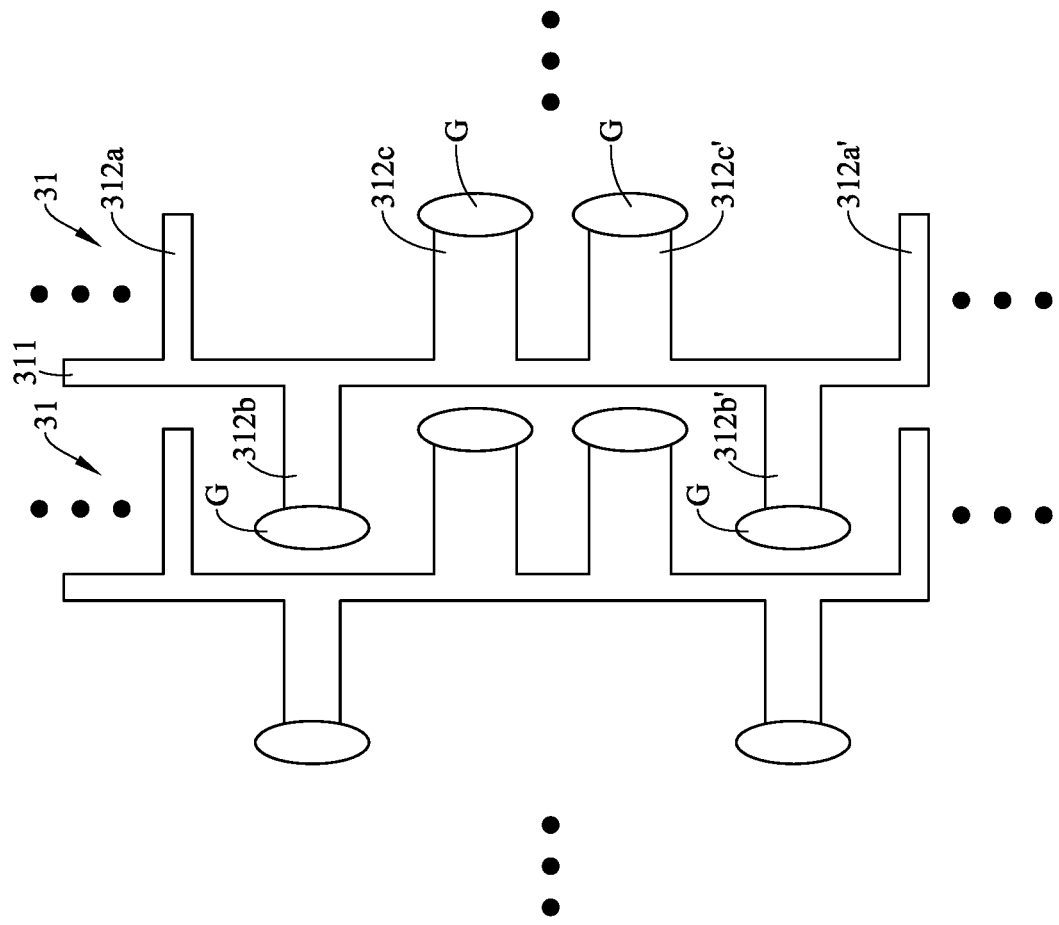
Figure 7C:
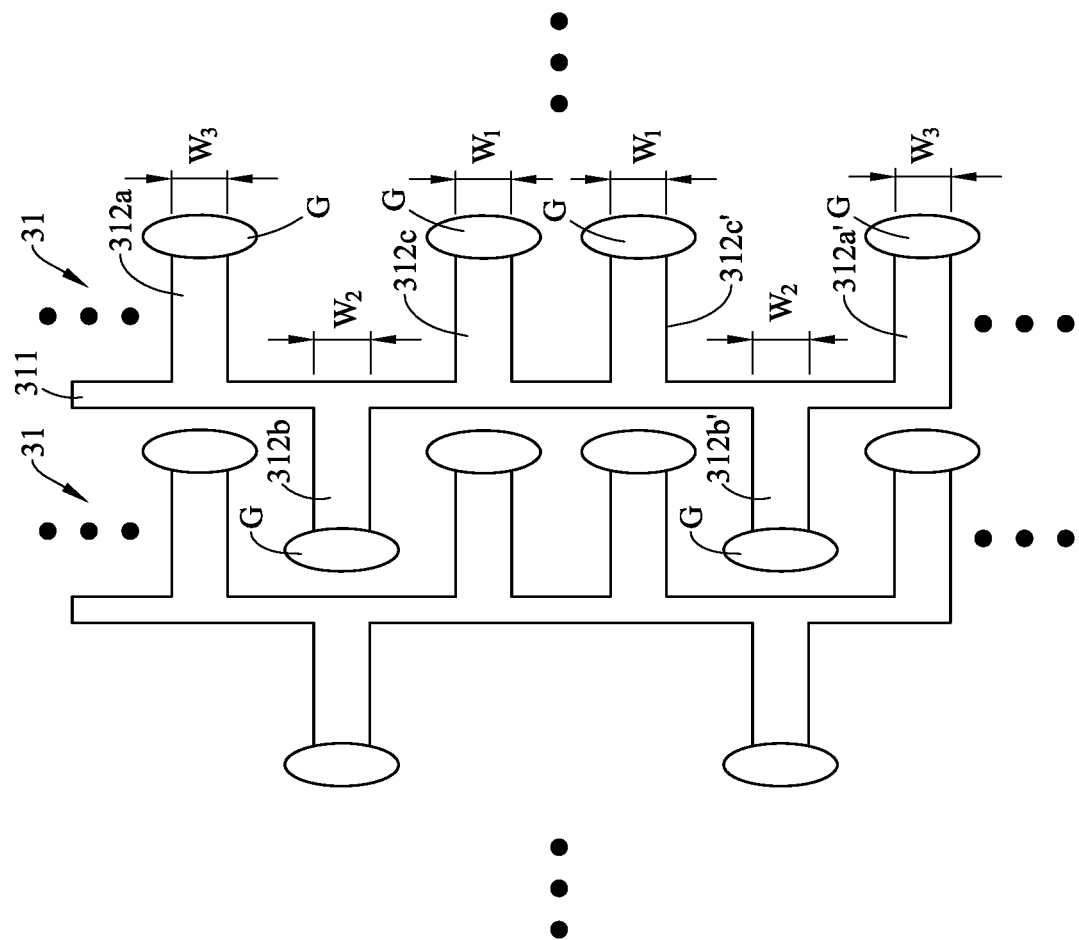

Please refer to FIG. 7A, FIG. 7B and FIG. 7C, which are structural diagrams of a collision avoidance radar in accordance with a third embodiment of the disclosure. As shown in FIG. 7A, the collision avoidance radar 3 includes a plurality of antenna arrays 31. Each of the antenna arrays 31 includes a connection portion 311 and an even number of antenna units 312a, 312a', 312b, 312b', 312c, 312c'. The embodiment illustrates the technical features of the collision avoidance radar 3 by each antenna array 31 having 6 antenna units 312a, 312a', 312b, 312b', 312c, 312c'. The antenna units 312a, 312a', 312b, 312b', 312c, 312c' are disposed on the two sides of the connection portion 311 respectively.

The antenna units 312c, 312c' are disposed at the center of the antenna array 31 and the other antenna units 312a, 312a', 312b, 312b' are disposed to be symmetric to each other about the center of the antenna array 31 serving as a symmetry center. The widths of the antenna units 312a, 312a', 312b, 312b', 312c, 312c' decrease from the center of the antenna array 31 to the two ends thereof. Besides, any two antenna units 312a, 312' or 312b, 312b' or 312c, 312c' symmetric to each other are disposed on the same side of the connection portion 311 and have the same width. In the embodiment, the connection portion 311 may be, but not limited to, a straight bar and the antenna units 312a, 312a', 312b, 312b', 312c, 312c' may also be, but not limited to, straight bars. In another embodiment, the connection portion 311 and the antenna units 312a, 312a', 312b, 312b', 312c, 312c' may have the other shapes. According to FIG. 7A, the antenna units 312a, 312a' are symmetric to each other and disposed on the right side of the connection portion 311, and have the same width $W_3$. The antenna units 312b, 312b' are symmetric to each other and disposed on the left side of the connection portion 311, and have the same width $W_2$. The antenna units 312c, 312c' are symmetric to each other and disposed on the right side of the connection portion 311, and have the same width $W_1$, where $W_1>W_2>W_3$. The other technical features of the collision avoidance radar 3 are similar to the previous embodiment, so will not be described herein again.

Similarly, it is not a necessary condition that all of the antenna units 312a, 312a', 312b, 312b', 312c, 312c' are grounded. As shown in FIG. 7B, the distal ends of the antenna unit 312a at the head of the connection portion 311 and the antenna unit 312a' at the tail of the connection portion 311 are not connected to the earth keys G. However, the distal ends of the antenna units 312b, 312b', 312c, 312c' between the antenna units 312a, 312a' are connected to the earth keys G.

As shown in FIG. 7C, the antenna units 312a, 312a', 312b, 312b', 312c, 312c' of the antenna arrays 31 can also have the same width ($W_1=W_2=W_3$).

The embodiment just exemplifies the disclosure and is not intended to limit the scope of the disclosure. Any equivalent modification and variation according to the spirit of the disclosure is to be also included within the scope of the following claims and their equivalents.

Figure 8A:
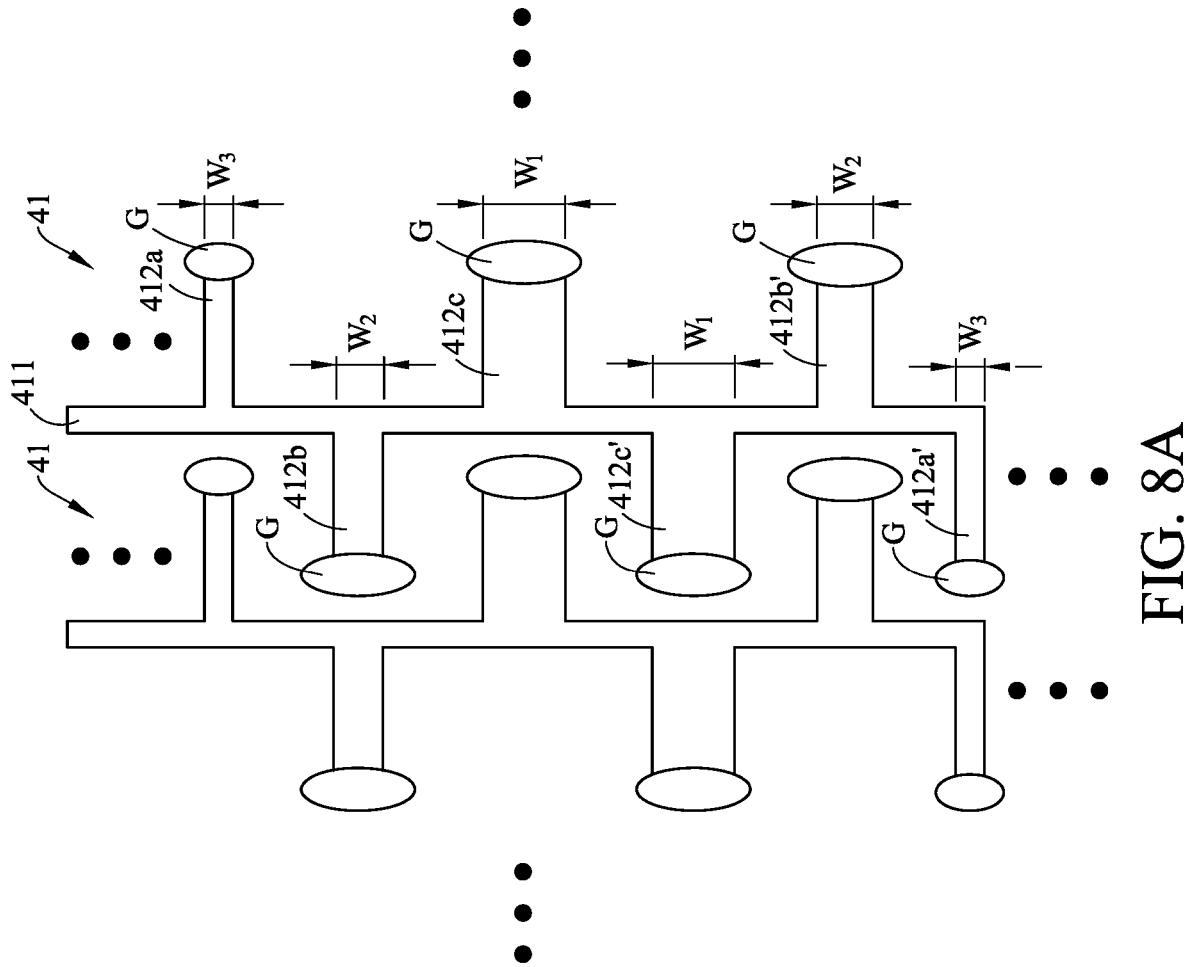
Figure 8C:
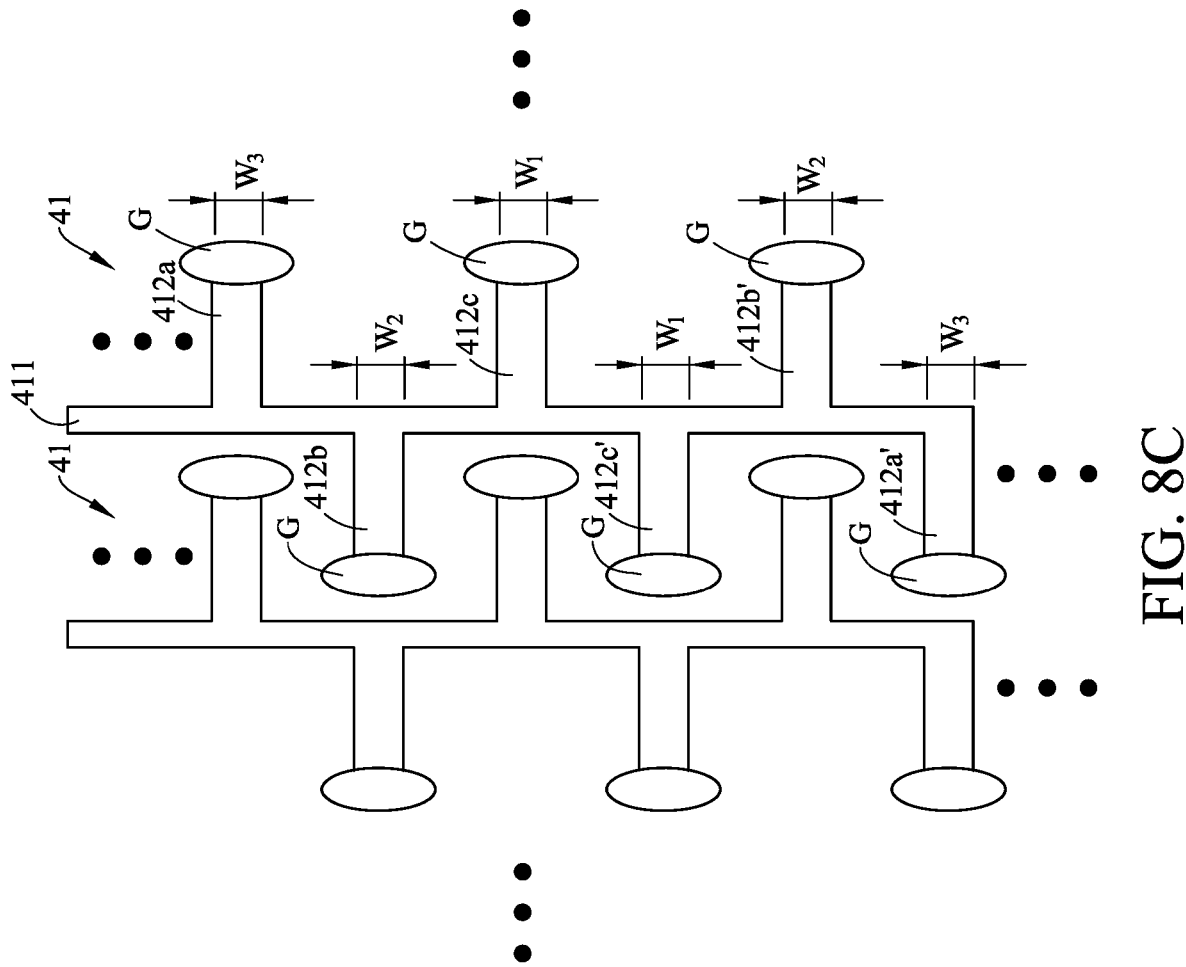

Please refer to FIG. 8A, FIG. 8B and FIG. 8C, which are structural diagrams of a collision avoidance radar in accordance with a fourth embodiment of the disclosure. As shown in FIG. 8A, the collision avoidance radar 4 includes a plurality of antenna arrays 41. Each of the antenna arrays 41 includes a connection portion 411 and an even number of antenna units 412a, 412a', 412b, 412b', 412c, 412c'. The embodiment illustrates the technical features of the collision avoidance radar 4 by each antenna array 41 having 6 antenna units 412a, 412a', 412b, 412b', 412c, 412c'. The antenna units 412a, 412a', 412b, 412b', 412c, 412c' are alternatively disposed on the two sides of the connection portion 411.

The antenna units 412c, 412c' are disposed at the center of the antenna array 41 and the other antenna units 412a, 412a', 412b, 412b' are disposed to be symmetric to each other about the center of the antenna array 41 serving as a symmetry center. The widths of the antenna units 412a, 412a', 412b, 412b', 412c, 412c' decrease from the center of the antenna array 41 to the two ends thereof. Besides, any two antenna units 412a, 412a' or 412b, 412b' or 412c, 412c' symmetric to each other are disposed on different sides of the connection portion 411 respectively and have the same width. In the embodiment, the connection portion 411 may be, but not limited to, a straight bar and the antenna units 412a, 412a', 412b, 412b', 412c, 412c' may also be, but not limited to, straight bars. In another embodiment, the connection portion 411 and the antenna units 412a, 412a', 412b, 412b', 412c, 412c' may have the other shapes. According to FIG. 8A, the antenna units 412a, 412a' are symmetric to each other, and disposed on the left side and the right side of the connection portion 411 respectively, and have the same width $W_3$. The antenna units 412b, 412b' are symmetric to each other, and disposed on the left side and the right side of the connection portion 411 respectively, and have the same width $W_2$. The antenna units 412c, 412c' are symmetric to each other, and disposed on the left side and the right side of the connection portion 411 respectively, and have the same width $W_1$, where $W_1>W_2>W_3$. The other technical features of the collision avoidance radar 4 are similar to the previous embodiment, so will not be described herein again.

Similarly, it is not a necessary condition that all of the antenna units 412a, 412a', 412b, 412b', 412c, 412c' are grounded. As shown in FIG. 8B, the distal ends of the antenna unit 412a at the head of the connection portion 411 and the antenna unit 412a' at the tail of the connection portion 411 are not connected to the earth keys G. However, the distal ends of the antenna units 412b, 412b', 412c, 412c' between the antenna units 412a, 412a' are connected to the earth keys G.

As shown in FIG. 8C, the antenna units 412a, 412a', 412b, 412b', 412c, 412c' of the antenna arrays 41 can also have the same width ($W_1=W_2=W_3$).

The embodiment just exemplifies the disclosure and is not intended to limit the scope of the disclosure. Any equivalent modification and variation according to the spirit of the disclosure is to be also included within the scope of the following claims and their equivalents.

Figure 9:
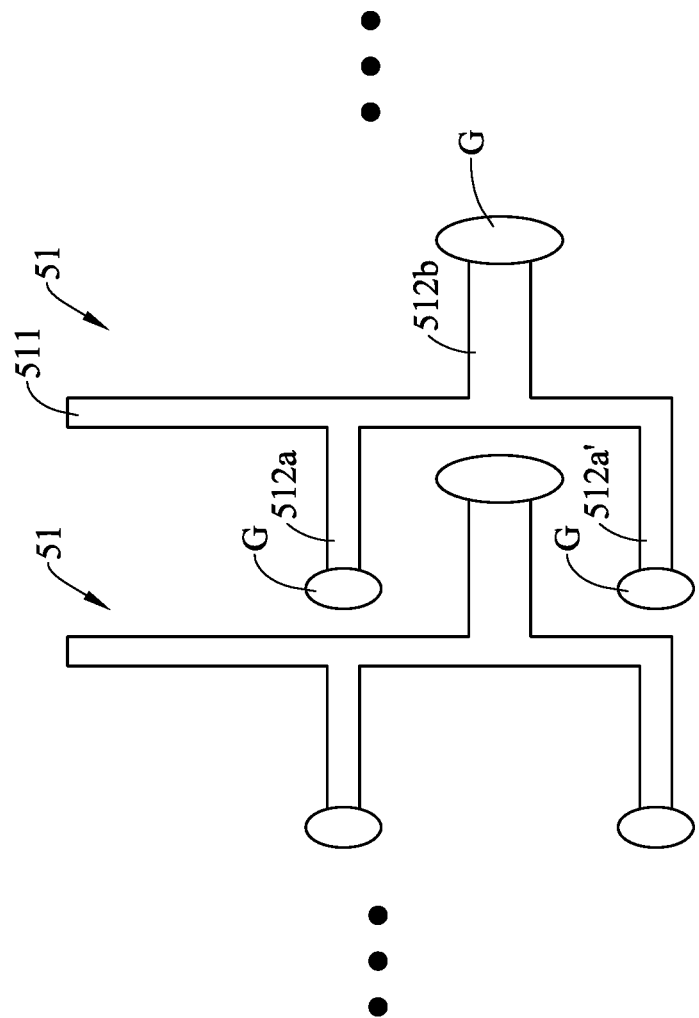
FIG. 9 is a structural diagram of a collision avoidance radar in accordance with a fifth embodiment of the disclosure.

Please refer to FIG. 9, which is a structural diagram of a collision avoidance radar in accordance with a fifth embodiment of the disclosure. As shown in FIG. 9, the collision avoidance radar 5 includes a plurality of antenna arrays 51. Each of the antenna arrays 51 includes a connection portion 511 and three antenna units 512a, 512a', 512b. The antenna units 512a, 512a' are alternatively disposed on the two sides of the connection portion 511. According to the embodiment, when the number of the antenna units of each antenna array 51 of the collision avoidance radar 5 is odd, the minimum number of the antenna units of each antenna array 51 is three.

The embodiment just exemplifies the disclosure and is not intended to limit the scope of the disclosure. Any equivalent modification and variation according to the spirit of the disclosure is to be also included within the scope of the following claims and their equivalents.

Figure 10:
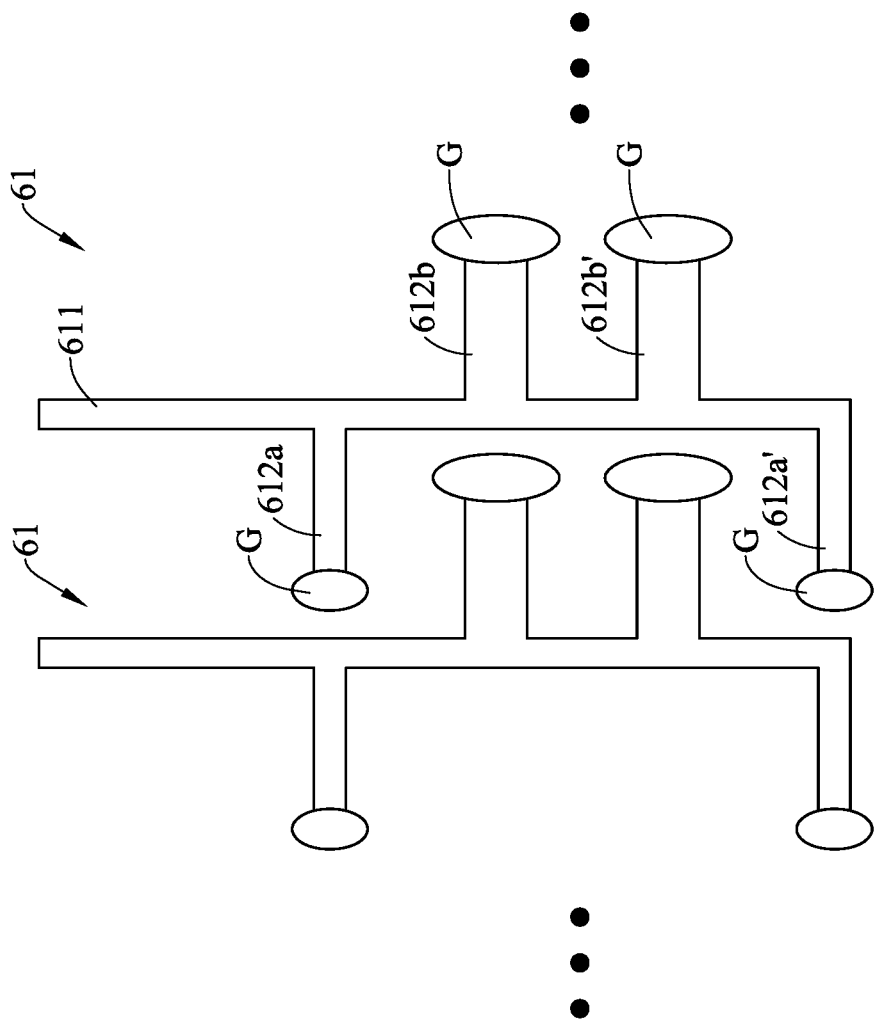
FIG. 10 is a structural diagram of a collision avoidance radar in accordance with a sixth embodiment of the disclosure.

Please refer to FIG. 10, which is a structural diagram of a collision avoidance radar in accordance with a sixth embodiment of the disclosure. As shown in FIG. 10, the collision avoidance radar 6 includes a plurality of antenna arrays 61. Each of the antenna arrays 61 includes a connection portion 611 and four antenna units 612a, 612a', 612b, 612b'. The antenna units 612a, 612a', 612b, 612b' are disposed on the two sides of the connection portion 611 respectively. In the embodiment, any two antenna units 612a, 612a' or 612b, 612b' symmetric to each other are disposed on the same sides of the connection portion 611. The antenna units 612a, 612a' are symmetric to each other and disposed on the left side of the connection portion 611. The antenna units 612b, 612b' are symmetric to each other and disposed on the right side of the connection portion 611. In another embodiment, the antenna units 612a, 612a', 612b, 612b' may be alternatively disposed on the two sides of the connection portion 611. In other words, the antenna units 612a, 612a' are symmetric to each other, and disposed on the left side and the right side of the connection portion 611 respectively. The antenna units 612b, 612b' are symmetric to each other, and disposed on the left side and the right side of the connection portion 611 respectively.

The other technical features of the collision avoidance radar 6 are similar to the previous embodiment, so will not be described herein again. According to the embodiment, when the number of the antenna units of each antenna array 61 of the collision avoidance radar 6 is even, the minimum number of the antenna units of each antenna array 61 is four.

The embodiment just exemplifies the disclosure and is not intended to limit the scope of the disclosure. Any equivalent modification and variation according to the spirit of the disclosure is to be also included within the scope of the following claims and their equivalents.

Figure 11:
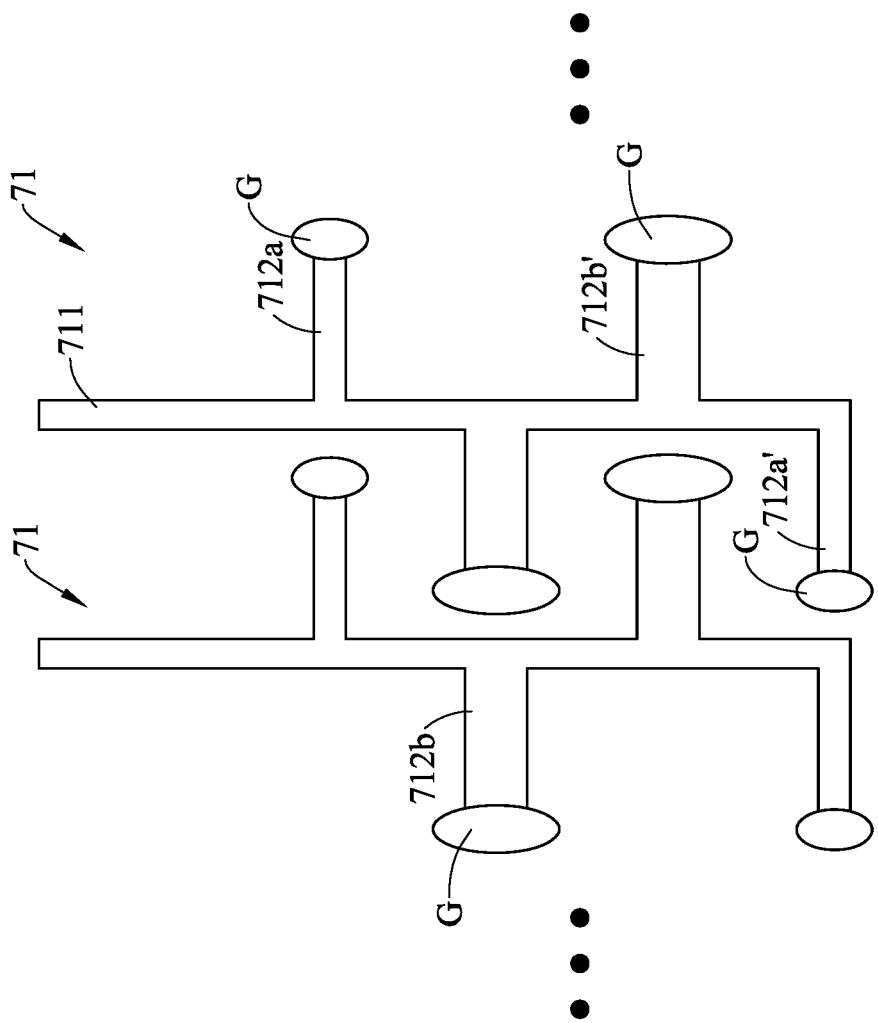
FIG. 11 is a structural diagram of a collision avoidance radar in accordance with a seventh embodiment of the disclosure.

Please refer to FIG. 11, which is a structural diagram of a collision avoidance radar in accordance with a seventh embodiment of the disclosure. As shown in FIG. 11, the collision avoidance radar 7 includes a plurality of antenna arrays 71. Each of the antenna arrays 71 includes a connection portion 711 and four antenna units 712a, 712a', 712b, 712b'. The antenna units 712b, 712b' are disposed at the center of the antenna array 71 and the other antenna units 712a, 712a' are disposed to be symmetric to each other about the center of the antenna array 71 serving as a symmetry center. The widths of the antenna units 712a, 712a', 712b, 712b' decrease from the center of the antenna array 71 to the two ends thereof. Besides, any two antenna units 712a, 712a' or 712b, 712b' symmetric to each other are disposed on different sides of the connection portion 71 respectively and have the same width.

The other technical features of the collision avoidance radar 7 are similar to the previous embodiment, so will not be described herein again. According to the embodiment, when the number of the antenna units of each antenna array 71 of the collision avoidance radar 7 is even, the minimum number of the antenna units of each antenna array 71 is four and the antenna arrays 71 can be realized by another structure.

The embodiment just exemplifies the disclosure and is not intended to limit the scope of the disclosure. Any equivalent modification and variation according to the spirit of the disclosure is to be also included within the scope of the following claims and their equivalents.

Figure 12:
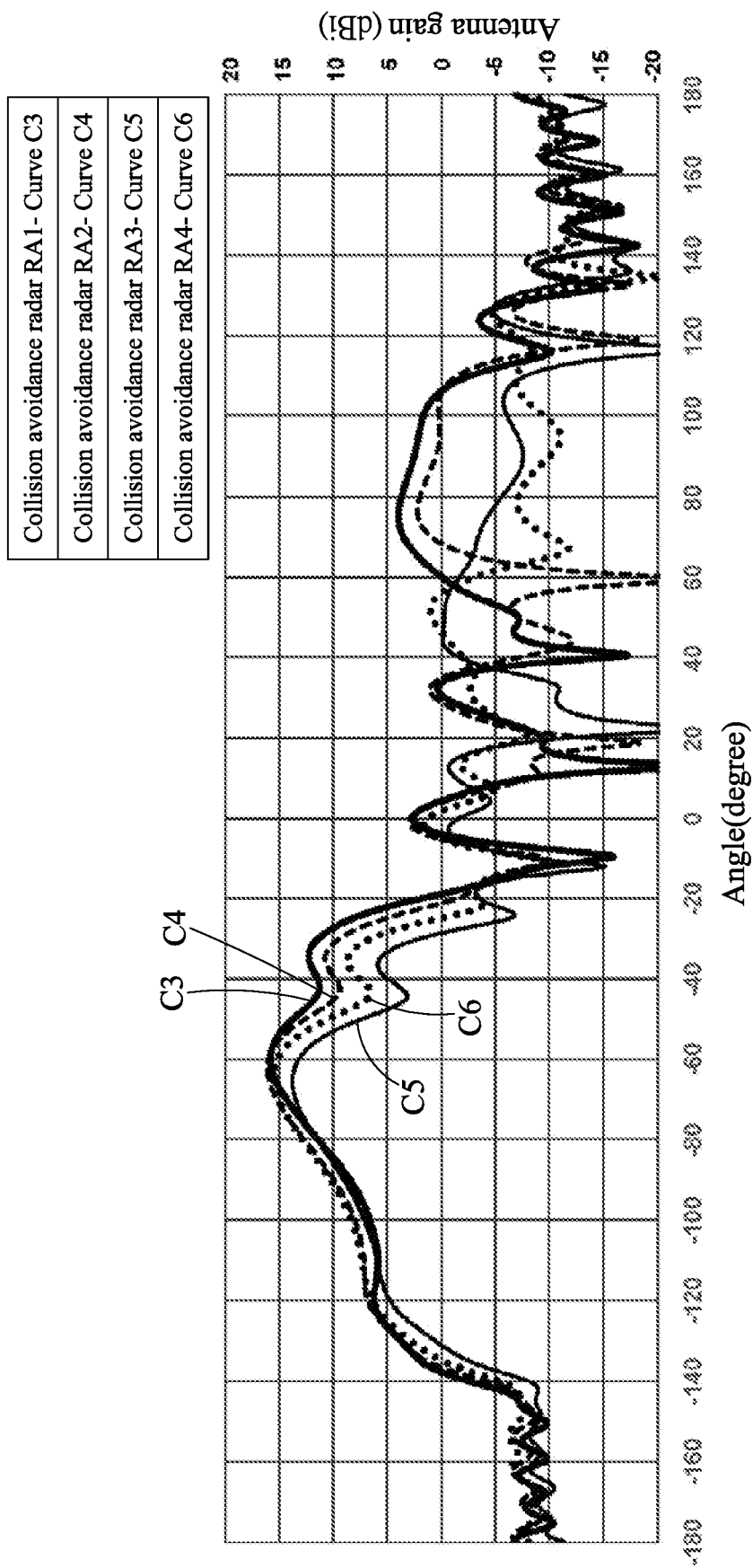
FIG. 12 is an antenna gain simulation result of the collision avoidance radars in accordance with the disclosure.

Please refer to FIG. 12, which is an antenna gain simulation result of the collision avoidance radars in accordance with the disclosure. As shown in FIG. 12, the curve C3 stands for the antenna gain of a currently available collision avoidance radar RA1 (the distance between two adjacent antenna arrays is 1.8 mm/0.5 wavelength) in different angles. The curve C4 stands for the antenna gain of a collision avoidance radar RA2 according to one embodiment of the disclosure (the distance between two adjacent antenna arrays is 1.6 mm/0.4 wavelength) in different angles. The curve C5 stands for the antenna gain of a collision avoidance radar RA3 according to one embodiment of the disclosure (the distance between two adjacent antenna arrays is 1.4 mm/0.35 wavelength) in different angles. The curve C6 stands for the antenna gain of a collision avoidance radar RA4 according to one embodiment of the disclosure (the distance between two adjacent antenna arrays is 1.2 mm/0.3 wavelength) in different angles.

FIG. 12 clearly shows that the antenna gains of all the collision avoidance radars RA2, RA3, RA4 can be greater than that of the collision avoidance radar RA1 within +60°~+130° and −60°~−130°. The collision avoidance radars RA2, RA3 (0.35 wavelength/0.4 wavelength) can especially achieve optimized effect. Thus, the collision avoidance radars RA2, RA3, RA4 according to the embodiments of the disclosure can actually accomplish excellent performance.

Figure 13:
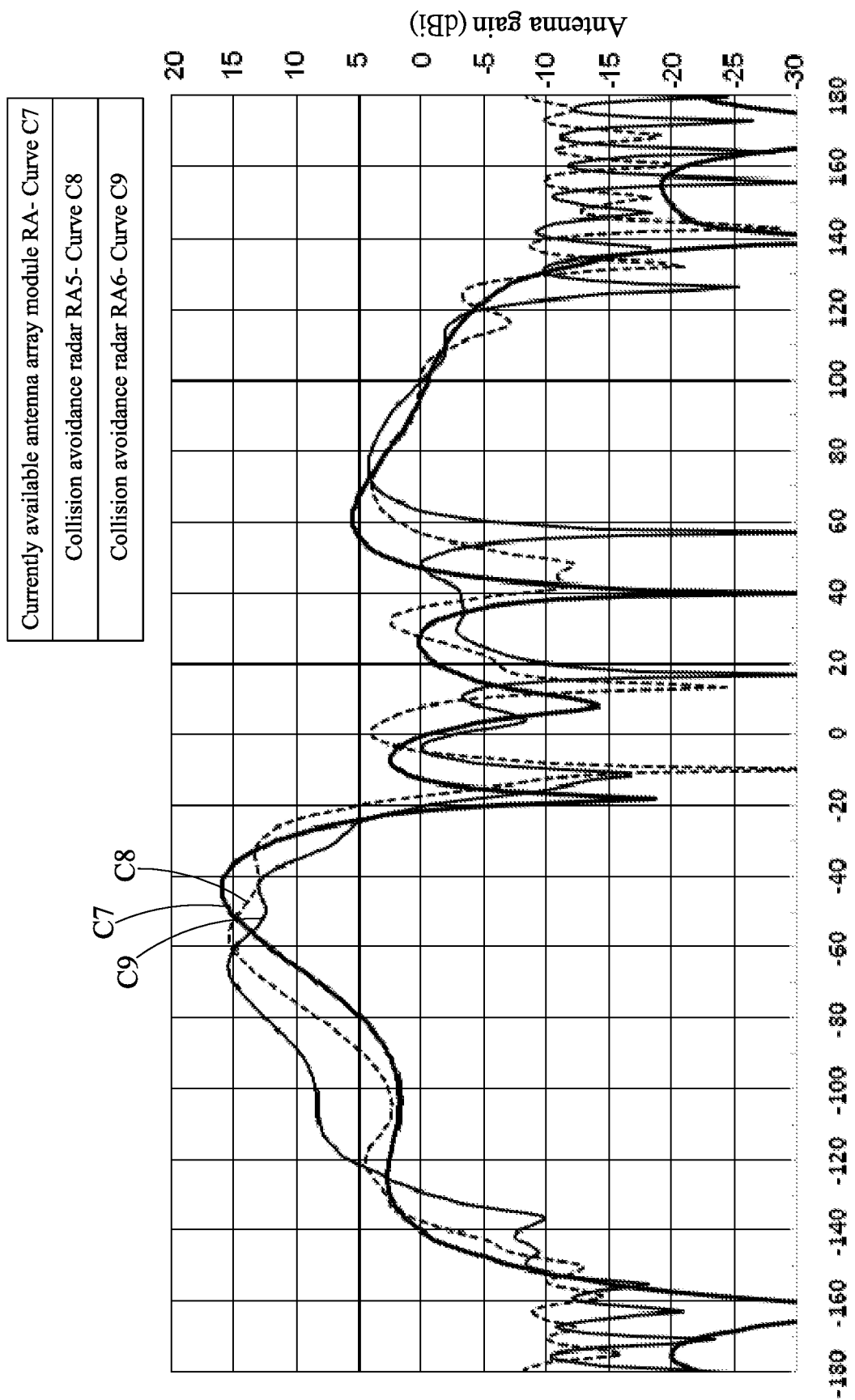
FIG. 13 is a simulation result of comparing a currently available patch antenna module with the collision avoidance radars in accordance with the disclosure.

Please refer to FIG. 13, which is a simulation result of comparing a currently available patch antenna module with the collision avoidance radars in accordance with the disclosure. As shown in FIG. 13, the curve C7 stands for the antenna gain of a currently path antenna array module PA (the distance between two adjacent antenna arrays is 1.8 mm/0.5 wavelength) in different angles. The curve C8 stands for the antenna gain of a collision avoidance radar RA5 (the distance between two adjacent antenna arrays is 1.8 mm/0.5 wavelength and the antenna units of each of the antenna arrays fail to connect to the earth keys G) in different angles. The curve C9 stands for the antenna gain of a collision avoidance radar RA6 according to one embodiment of the disclosure (the distance between two adjacent antenna arrays is 1.6 mm/0.4 wavelength) in different angles. FIG. 13 clearly shows that the collision avoidance radar RA6 according to the embodiment of the disclosure can actually achieve better performance.

To sum up, according to the embodiments of the disclosure, the collision avoidance radar includes a plurality of antenna arrays. Some or all of the antenna units of each antenna array are grounded. Besides, the length of the antenna units and the distance between the adjacent antenna units are less than or equal to ¼ wavelength and ½ wavelength of the operating frequency of the antenna array respectively. The above design can effectively increase the antenna gain of the large view field (greater than +70° and less than −70°) of the collision avoidance radar. Thus, the FoV of the collision avoidance radar can be significantly increased and the blind zone thereof can be decreased, which can effectively improve the lateral detection ability and rear detection ability of the collision avoidance radar.

Also, according to the embodiments of the disclosure, the collision avoidance radar includes a plurality of antenna arrays and the distance between any two adjacent antenna arrays is less than or equal to ¾ wavelength of the operating frequency of the antenna arrays. In this way, the antenna gain of the large view field (greater than +70° and less than −70°) of the collision avoidance radar can be further increased. Thus, the FoV of the collision avoidance radar can be further increased to reduce the blind zone, so the lateral detection ability and the rear detection ability of the collision avoidance radar can be effectively improved.

Besides, according to the embodiments of the disclosure, the FoV of the collision avoidance radar can be effectively increased. In addition, the strength and the phase of the radiation energy of the antenna arrays thereof can be controlled by beam forming technology, such that the radiation energy of the antenna arrays can be concentrated at a specific direction. Thus, the detection range of the collision avoidance radar can be increased, and the lateral detection ability and the rear detection ability of the collision avoidance radar can be further improved.

Further, according to the embodiments of the disclosure, the antenna arrays of the collision avoidance radar can achieve great performance, so the radar sensor having one antenna array can just achieve the desired technical effect. Therefore, the cost of the collision avoidance radar can be obviously reduced, so the market competitiveness of the collision avoidance radar can be further enhanced.

Moreover, according to the embodiments of the disclosure, the collision avoidance radar includes a plurality of antenna arrays, and the distance between any two adjacent antenna arrays can be less than or equal to ¾ wavelength of the operating frequency of the antenna arrays. Thus, the size of the collision avoidance radar can decrease, so the application of the collision avoidance radar can be more flexible.

Furthermore, according to the embodiments of the disclosure, the collision avoidance radar includes a plurality of antenna arrays and the antenna units of each antenna array have different widths so as to reduce the strength of the side lobes of the antenna array. Therefore, the SNR of the collision avoidance radar can be obviously increased, so the performance of the collision avoidance radar can be further improved.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An antenna array, comprising:
   a connection portion; and
   a plurality of antenna units, disposed on two sides of the connection portion respectively;
   wherein a proximal end of each of the antenna units is connected to the connection portion and a distal end of one or more of the antenna units is grounded, a length of each of the antenna units is less than or equal to ¼ wavelength of an operating frequency of the antenna array and a distance between any two adjacent antenna units is less than or equal to ½ wavelength of the operating frequency of the antenna array.

2. The antenna array of claim 1, wherein the length of each of the antenna units is substantially ⅛~⅜ wavelength of the operating frequency of the antenna array.

3. The antenna array of claim 1, wherein the distance between any two adjacent antenna units is substantially ¼~¾ wavelength of the operating frequency of the antenna array.

4. The antenna array of claim 1, wherein the distal ends of all of the antenna units are grounded.

5. The antenna array of claim 1, wherein widths of the antenna units are not completely equal to each other.

6. The antenna array of claim 1, wherein the antenna units are alternatively disposed on the two sides of the connection portion to form a comb structure.

7. The antenna array of claim 1, wherein a number of the antenna units is odd and widths of the antenna units decrease from a center of the antenna array to two ends of the antenna array.

8. The antenna array of claim 7, wherein one of the antenna units is disposed at the center of the antenna array, the others of the antenna units are disposed to be symmetric to each other about the center of the antenna array serving as a symmetry center, any two antenna units symmetric to each other are disposed on the same side of the connection portion and have the same width.

9. The antenna array of claim 1, wherein a number of the antenna units is even and widths of the antenna units decrease from a center of the antenna array to two ends of the antenna array.

10. The antenna array of claim 9, wherein the antenna units are disposed to be symmetric to each other about the center of the antenna array serving as a symmetry center, any two antenna units symmetric to each other are disposed on different sides of the connection portion respectively and have the same width.

11. The antenna array of claim 1, wherein a number of the antenna units is even and widths of the antenna units decrease from a center of the antenna array to two ends of the antenna array.

12. The antenna array of claim 11, wherein two of the antenna units are disposed at the center of the antenna array and disposed on the same side of the connection portion, the others of the antenna units are disposed to be symmetric to each other about the center of the antenna array serving as a symmetry center, any two antenna units symmetric to each other are disposed on different sides of the connection portion respectively and have the same width.

13. A collision avoidance radar, comprising:
   a plurality of antenna arrays, wherein a distance between any two adjacent antenna arrays is less than or equal to ¾ wavelength of an operating frequency of the antenna arrays, and each of the antenna arrays comprises:
      a connection portion; and
      a plurality of antenna units, disposed on two sides of the connection portion respectively;
   wherein a proximal end of each of the antenna units is connected to the connection portion and a distal end of one or more of the antenna units is grounded, a length of each of the antenna units is less than or equal to ¼ wavelength of an operating frequency of the antenna array and a distance between any two adjacent antenna units is less than or equal to ½ wavelength of the operating frequency of the antenna array.

14. The collision avoidance radar of claim 13, wherein the distance between any two adjacent antenna arrays is 0.3~0.5 wavelength of the operating frequency of the antenna arrays.

15. The collision avoidance radar of claim 13, wherein the distance between any two adjacent antenna arrays is 0.35~0.4 wavelength of the operating frequency of the antenna arrays.

16. The collision avoidance radar of claim 13, wherein a length of each of the antenna units of the antenna array is ⅛~⅜ wavelength of the operating frequency of the antenna array.

17. The collision avoidance radar of claim 13, wherein a distance between any two adjacent antenna units of the antenna array is ¼~¾ wavelength of the operating frequency of the antenna array.

18. The collision avoidance radar of claim 13, wherein the distal ends of all of the antenna units of the antenna array are grounded.

19. The collision avoidance radar of claim 13, wherein widths of the antenna units of the antenna array are not completely equal to each other.

20. The collision avoidance radar of claim 13, wherein the antenna units of the antenna array are alternatively disposed on the two sides of the connection portion to form a comb structure.

21. The collision avoidance radar of claim 13, wherein a number of the antenna units of the antenna array is odd and widths of the antenna units decrease from a center of the antenna array to two ends of the antenna array.

22. The collision avoidance radar of claim 21, wherein one of the antenna units of the antenna array is disposed at the center of the antenna array, the others of the antenna units are disposed to be symmetric to each other about the center of the antenna array serving as a symmetry center, any two antenna units symmetric to each other are disposed on the same side of the connection portion and have the same width.

23. The collision avoidance radar of claim 13, wherein a number the antenna units is even and widths of the antenna units decrease from a center of the antenna array to two ends of the antenna array.

24. The collision avoidance radar of claim 23, wherein the antenna units of the antenna array are disposed to be symmetric to each other about the center of the antenna array serving as a symmetry center, any two antenna units symmetric to each other are disposed on different sides of the connection portion respectively and have the same width.

25. The collision avoidance radar of claim 13, wherein a number of the antenna units is even and widths of the antenna units decrease from a center of the antenna array to two ends of the antenna array.

26. The collision avoidance radar of claim 25, wherein two of the antenna units of the antenna array are disposed at the center of the antenna array and disposed on the same side of the connection portion, the others of the antenna units are disposed to be symmetric to each other about the center of the antenna array serving as a symmetry center, any two antenna units symmetric to each other are disposed on different sides of the connection portion respectively and have the same width.

* * * * *